(12) United States Patent
Liao

(10) Patent No.: US 8,561,831 B2
(45) Date of Patent: Oct. 22, 2013

(54) DEVICE HOUSING AND MANUFACTURING METHOD

(75) Inventor: Kai-Rong Liao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 3 days.

(21) Appl. No.: 13/336,014

(22) Filed: Dec. 23, 2011

(65) Prior Publication Data

US 2013/0009525 A1 Jan. 10, 2013

(51) Int. Cl.
*B29C 45/14* (2006.01)
*B65D 25/54* (2006.01)
*B65D 8/04* (2006.01)

(52) U.S. Cl.
USPC ......... 220/602; 220/4.01; 220/4.02; 220/677; 264/273; 312/223.1; 312/223.4; 455/575.1

(58) Field of Classification Search
USPC ............... 220/4.01, 4.02, 602, 677; 264/273; 312/223.1, 223.4; 455/575.1, 575.8
See application file for complete search history.

(56) References Cited

U.S. PATENT DOCUMENTS

| 7,236,357 B2 * | 6/2007 | Chen ......................... 361/679.55 |
| 2010/0061044 A1 * | 3/2010 | Zou et al. .................. 361/679.01 |
| 2011/0049139 A1 * | 3/2011 | Jiang et al. ................... 220/4.01 |

* cited by examiner

*Primary Examiner* — Anthony Stashick
*Assistant Examiner* — Madison L Poos
(74) *Attorney, Agent, or Firm* — Altis & Wispro Law Group, Inc.

(57) ABSTRACT

A device housing includes a glass panel, a metal frame, and a housing body. The metal frame defines a plurality of through holes, and the glass panel is latched in the metal frame. The housing body includes a base and a reinforcement portion integrally formed together. The base surrounds the metal frame and the glass panel, and the reinforcement portion extends through the through holes of the metal frame and is bonded to the glass panel.

8 Claims, 5 Drawing Sheets

DEVICE HOUSING AND MANUFACTURING METHOD

BACKGROUND

1. Technical Field

The present disclosure generally relates to housing manufacturing, particularly to a device housing with a glass panel and a method for manufacturing the housing.

2. Description of Related Art

Currently, portable electronic devices such as mobile phones, laptops and personal digital assistants (PDAs) are in widespread use and incorporate plastic housings. However, electronic elements of the portable electronic devices received in such housings may be easily damaged if the devices are dropped.

Many portable electronic devices include a plastic housing and display parts made of glass. However, because the density and specific gravity of the display parts is so much greater than plastic, the plastic housing may deform over time, particular around the glass parts, which may degrade the connection between the glass and the plastic.

Therefore, there is room for improvement within the art.

BRIEF DESCRIPTION OF THE DRAWINGS

Many aspects of the housing and the method for manufacturing the housing can be better understood with reference to the following drawings. The components in the drawings are not necessarily to scale, the emphasis instead being placed upon clearly illustrating the housing and the method for manufacturing the housing. Moreover, in the drawings, like reference numerals designate corresponding parts throughout the several views.

DETAILED DESCRIPTION

Figure 1:
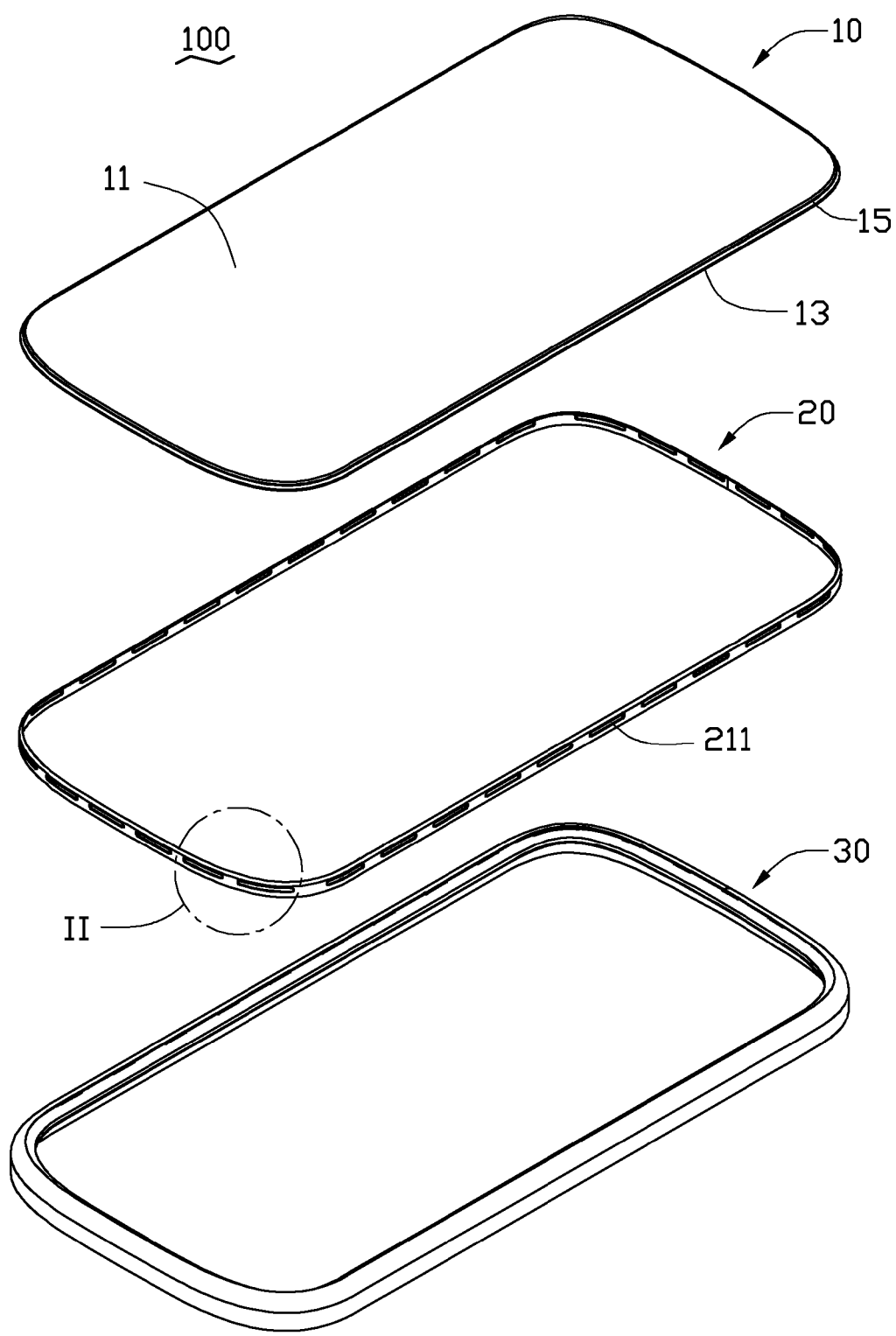
FIG. 1 is a schematic, exploded view of an exemplary embodiment of a housing.

Referring to FIG. 1, in an exemplary embodiment, a housing 100 of a portable electronic device includes a glass panel 10, a metal frame 20, and a housing body 30.

Figure 5:
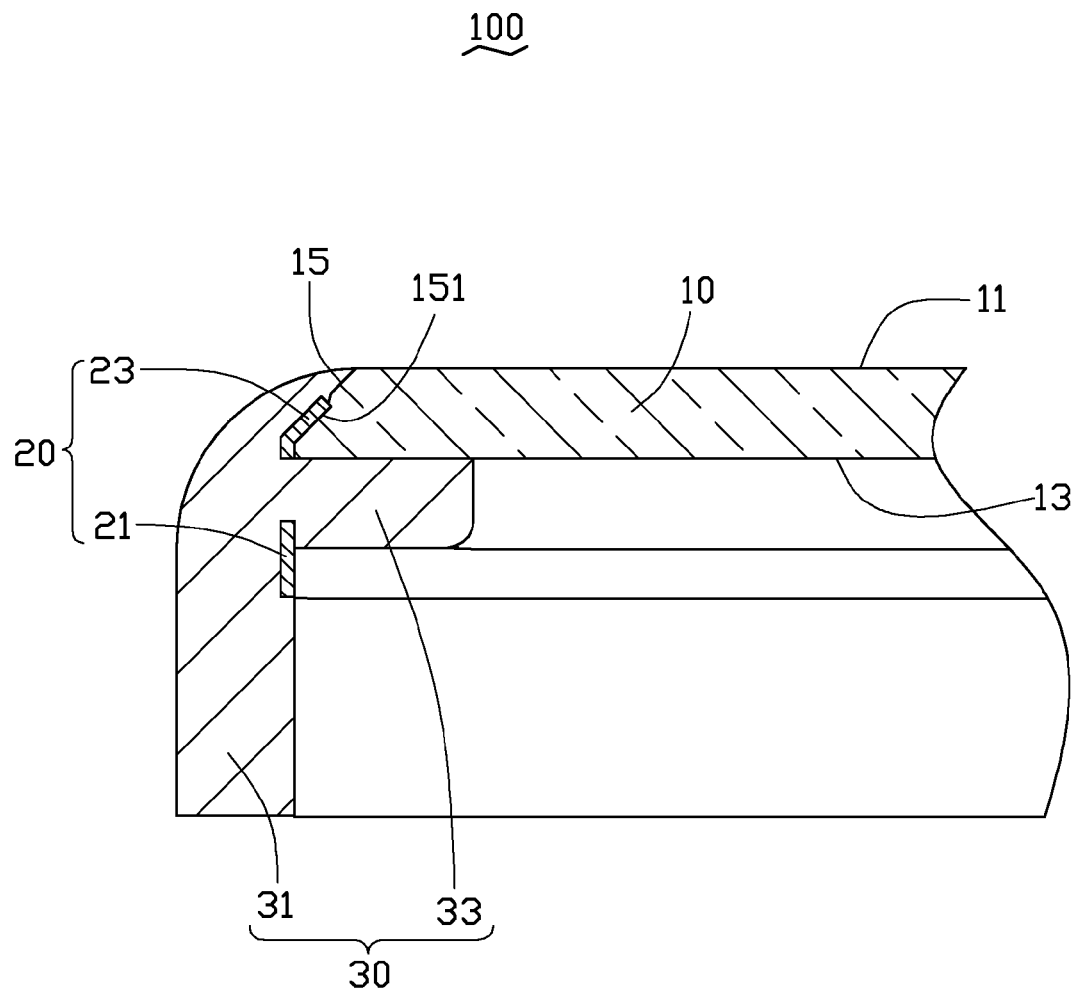
FIG. 5 is a partial cross-sectional view of the assembly housing shown in FIG. 4 taken along line IV-IV.

The panel 10 is configured for being received in the metal frame 20. The panel 10 includes a first surface 11, a second surface 13 opposite to the first surface 11, and a number of side surfaces 15 connected to the first surface 11 and the second surface 13. In order to stably connect the panel 10 to the housing body 30, the side surfaces 15 are sloped. Referring to FIG. 5, one end of each side surface 15 is connected to the first surface 11 at an acute angle, and the other end of each side surface 15 is connected to the second surface 13 at an obtuse angle. A closed groove 151 is defined in all the side surfaces 15.

Figure 2:
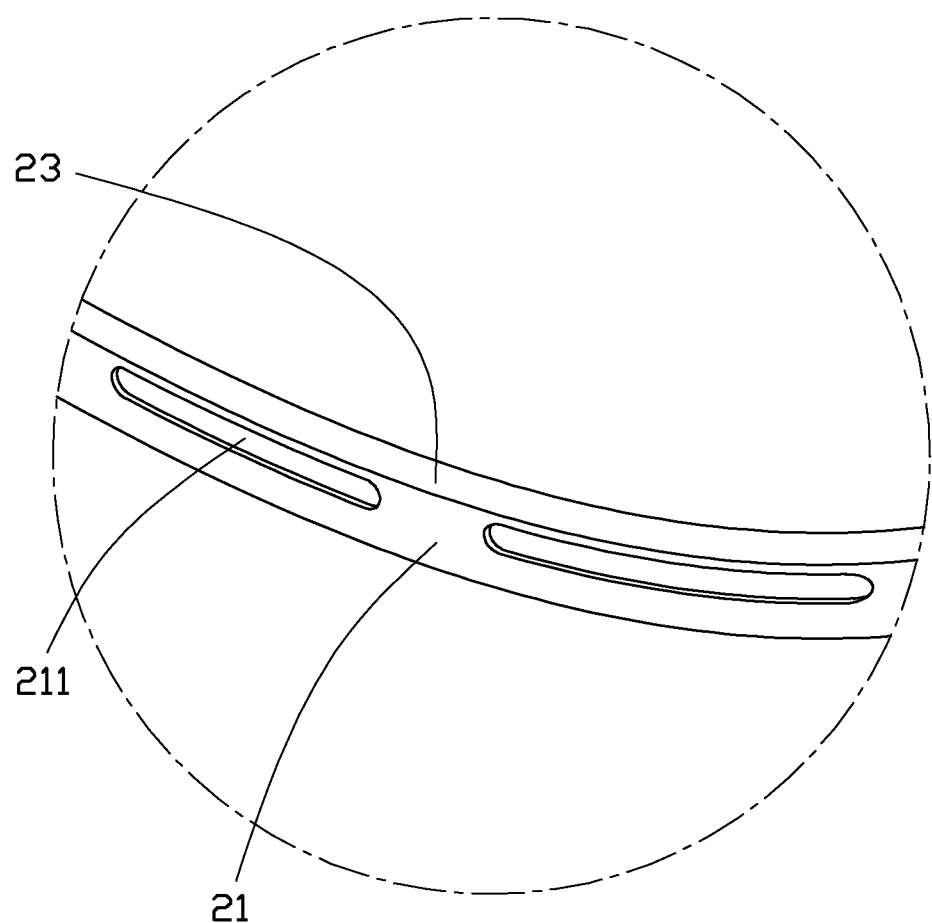
FIG. 2 is an enlarged view of a metal frame of the housing shown in a circular area II of FIG. 1.

Referring to FIGS. 1 and 2, the metal frame 20 is a closed frame, and includes a main section 21 and a bent edge 23 integrally formed together. The main section 21 is substantially straight relative to the bent edge 22. The main section 21 defines a number of long and narrow spaced through holes 211. The bent edge 23 extends from one side of the main section 21, and is slanted toward the inside of the metal frame 20. When the panel 10 is received in the metal frame 20, the bent edge 23 is tightly latched in the closed groove 151 to effectively prevent the panel 10 falling out of the metal frame 20. The metal frame 20 is made of stainless steel, and may be formed by stamping or punched from a metal sheet.

Figure 3:
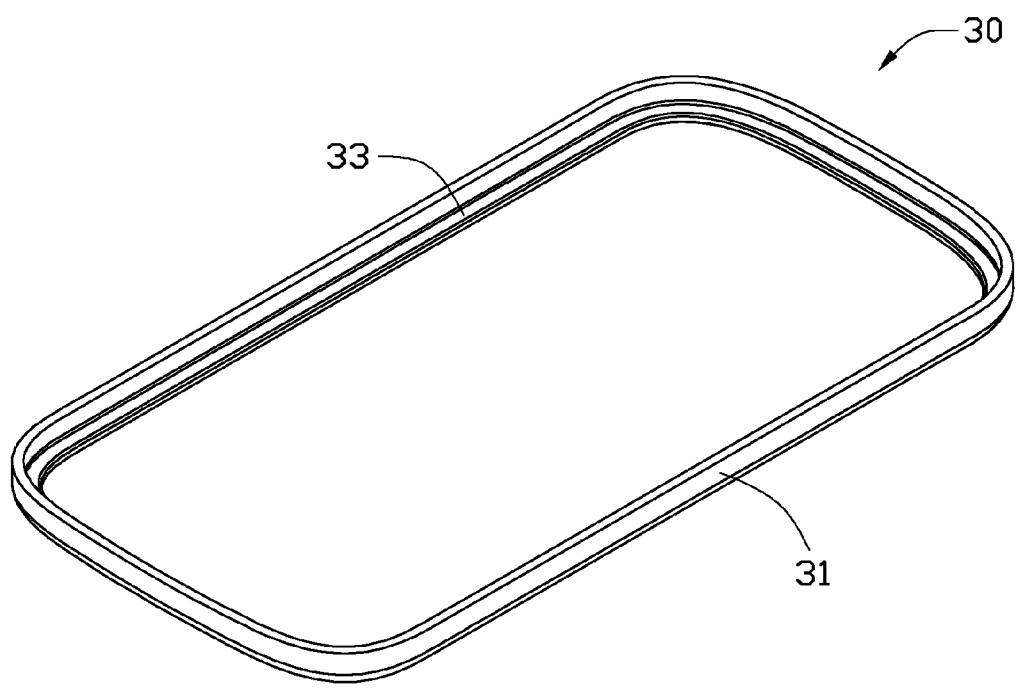
FIG. 3 is a schematic view of a plastic housing body shown in FIG. 1.
Figure 4:
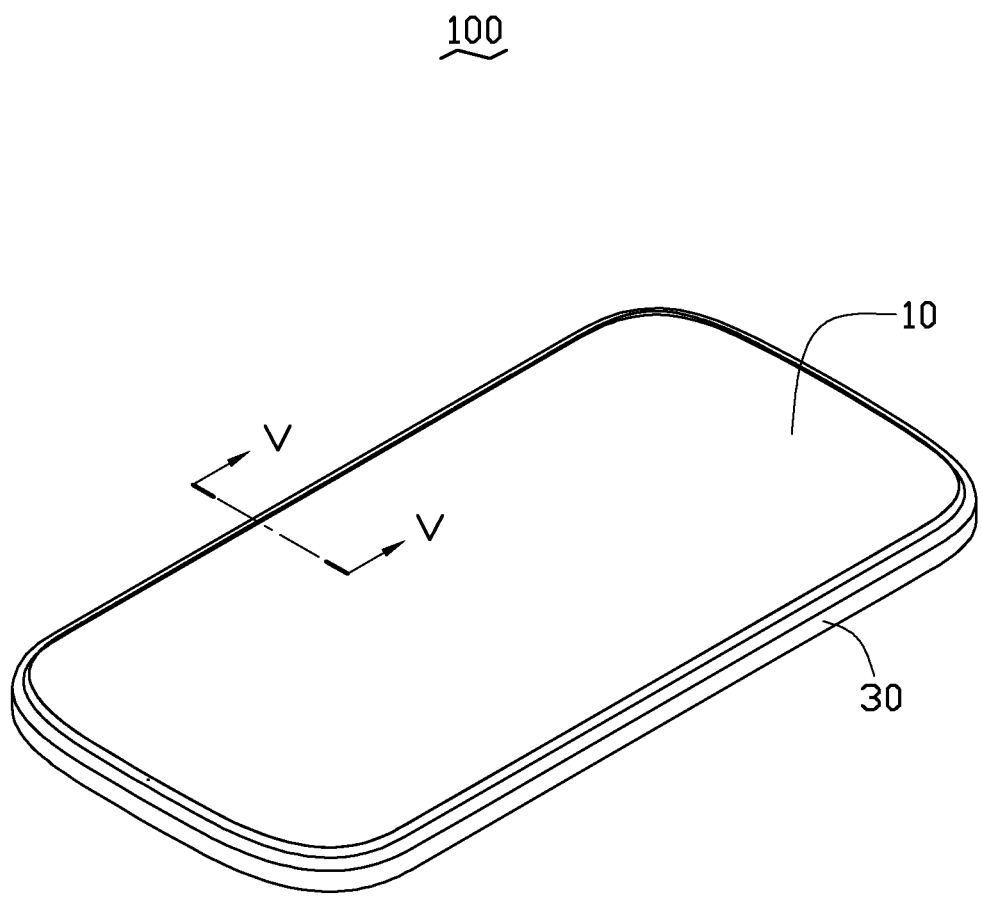
FIG. 4 is a schematic view of the assembled housing in FIG. 1.

Referring to FIGS. 3 and 5, the housing body 30 is made of plastic material, and includes a base 31 and a closed reinforcement portion 33 integrally formed together by injection molding. The base 31 is molded to surround the metal frame 20 and the panel 10. The closed reinforcement portion 33 protrudes from an inner peripheral wall of the base 31 to form an annular shape. The closed reinforcement portion 33 extends through the through holes 211 of the metal frame 20 during molding, and bonds the second surface 13 of the panel 10.

Therefore, the panel 10 is latched to the metal frame 20, and is surrounded by the housing body 30. Additionally, the closed reinforcement portion 33 supports the edges of the panel 10. This design can keep the panel 10 secure and stably positioned on the housing body 30 for a long period of time.

A method for manufacturing the housing 100 is described as follows.

Firstly, the panel 10 is received in the metal frame 20, and the bent edge 23 is tightly latched in the closed groove 151. An injection mold is provided. The assembled metal frame 20 with the panel 10 is positioned in a die chamber of the injection mold. During molding, the molten plastic flows through the through holes 211 of the metal frame 20 and joins together inside the metal frame 20 to form the annular closed reinforcement portion 33. After the injection molding process, the panel 10 is tightly bonded with the metal frame 20 and the housing body 20 to form the housing 100.

The panel 10, a metal frame 20 and the housing 30 are integrally formed together by the above method. The method for manufacturing the housing 100 by the injection mold increases processing efficiency and reduces production timeframe. Additionally, one side of the panel 10 is latched by the metal frame 20 and the housing body 30, and the other side is supported by the closed reinforcement portion 33. This secure the panel 10 is stably positioned on the housing body 30.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A device housing comprising:
   a glass panel;
   a metal frame defining a plurality of through holes, the glass panel latched in the metal frame; and
   a housing body including a base and a reinforcement portion protruding from an inner peripheral wall of the base to form an annular shape, the base surrounding the metal frame and the glass panel, the reinforcement portion extending through the through holes of the metal frame and bonding the glass panel to support the glass panel.

2. The device housing as claimed in claim 1, wherein the glass panel includes a first surface, a second surface opposite to the first surface, and a side surface connected to the first surface and the second surface, and the side surface is sloped.

3. The device housing as claimed in claim 2, wherein one end of the side surface is connected to the first surface at an acute angle, and the other end of each side surface is connected to the second surface at an obtuse angle, and the actuate angle is latched in the metal frame.

4. The device housing as claimed in claim 2, wherein the reinforcement portion bonds the second surface of the glass panel.

5. The device housing as claimed in claim 1, wherein a groove is defined in the glass panel, the metal frame includes a main section and a bent edge integrally formed together, and the bent edge is latched in the groove.

6. The device housing as claimed in claim 5, wherein the bent edge extends from one side of the main section, and is slanted toward an inside of the metal frame.

7. A method for manufacturing a device housing, comprising:
    providing a glass panel and a metal frame, the metal frame defining a plurality of through holes;
    latching the glass panel in the metal frame;
    injecting molten plastic into a die chamber of an injection mold to form a base, and the molten plastic passing through the through holes of the metal frame from the base to form a reinforcement portion, the base surrounding the metal frame and the glass panel, the reinforcement portion bonding the glass panel to support the glass panel.

8. The method as claimed in claim 7, wherein the glass penal includes a first surface and a second surface opposite to the first surface; the reinforcement portion bonds the second surface of the glass panel.

* * * * *